United States Patent
Inkley et al.

(10) Patent No.: US 10,948,954 B2
(45) Date of Patent: Mar. 16, 2021

(54) PROCESSOR POWER OPTIMIZATION IN TERMS OF SYSTEM COOLING OVERHEAD

(71) Applicant: Intel Corporation, Santa Clara, CA (US)

(72) Inventors: Benson D. Inkley, Hillsboro, OR (US); Laxmi Vishwanathan, Beaverton, OR (US)

(73) Assignee: Intel Corporation, Santa Clara, CA (US)

(*) Notice: Subject to any disclaimer, the term of this patent is extended or adjusted under 35 U.S.C. 154(b) by 141 days.

(21) Appl. No.: 16/114,572

(22) Filed: Aug. 28, 2018

(65) Prior Publication Data

US 2019/0041927 A1  Feb. 7, 2019

(51) Int. Cl.
```
G06F 1/00       (2006.01)
G06F 1/20       (2006.01)
G06F 1/3206     (2019.01)
G06F 1/3296     (2019.01)
G06F 1/324      (2019.01)
```
(52) U.S. Cl.
CPC .............. *G06F 1/206* (2013.01); *G06F 1/324* (2013.01); *G06F 1/3206* (2013.01); *G06F 1/3296* (2013.01)

(58) Field of Classification Search
None
See application file for complete search history.

(56) References Cited

U.S. PATENT DOCUMENTS

| 6,718,164 | B1* | 4/2004 | Korneluk | H03F 1/30 219/208 |
| 2006/0131743 | A1* | 6/2006 | Erickson | G06F 21/71 257/737 |
| 2007/0143584 | A1* | 6/2007 | Capps | G06F 1/206 713/1 |
| 2012/0323400 | A1* | 12/2012 | Sankar | G06F 1/206 700/300 |
| 2014/0379290 | A1* | 12/2014 | Wlodarczyk | G06F 1/206 702/130 |

OTHER PUBLICATIONS

Wikipedia, "Microcode", en.wikipedia.org/wiki/Microcode, Retrieved on Jul. 31, 2018, 11 pages.

* cited by examiner

*Primary Examiner* — Nitin C Patel
(74) *Attorney, Agent, or Firm* — Jordan IP Law, LLC

(57) ABSTRACT

Systems, apparatuses and methods may provide for technology that determines an efficient temperature of a processor based on real-time data and one or more part-specific parameters associated with the processor, determines a set of power differences between other temperatures and the efficient temperature, and stores the set of power differences to a register. In one example, a cooling subsystem is controlled based on the set of power differences in the register.

17 Claims, 3 Drawing Sheets

26

28 — Determine an efficient temperature of a processor based on real-time data and part-specific parameter(s) associated with the processor 30 — Determine a set of power differences between other temperatures and the efficient temperature 32 — Store the set of power differences to a register 34 — Control a cooling subsystem based on the set of power differences in the register

FIG. 4

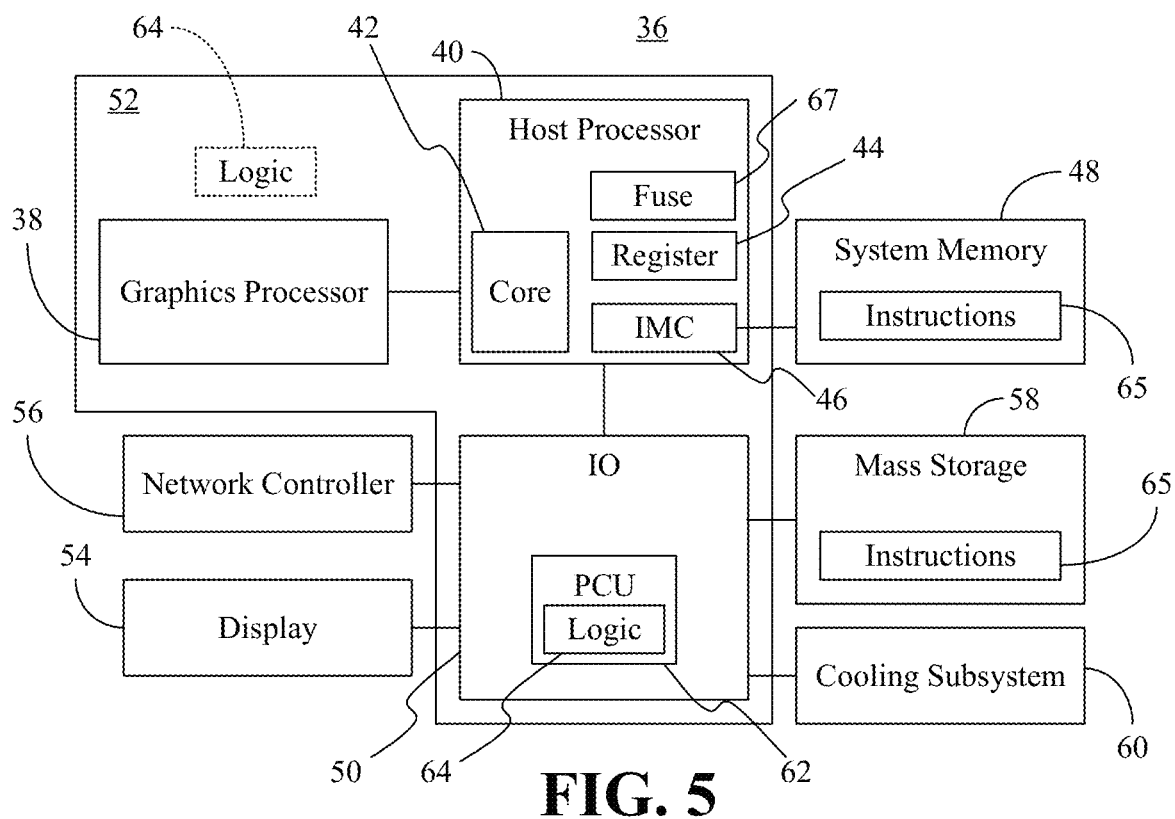

FIG. 5

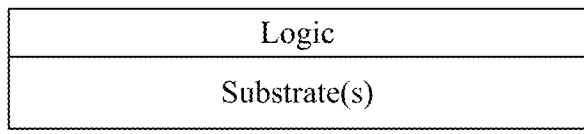

PROCESSOR POWER OPTIMIZATION IN TERMS OF SYSTEM COOLING OVERHEAD

TECHNICAL FIELD

Embodiments generally relate to power management in computer processors. More particularly, embodiments relate to processor power optimization in terms of system cooling overhead.

BACKGROUND

Cooling systems may reduce the junction temperature (e.g., the highest internal transistor operating temperature) of computer processors to ensure proper operation of the processors. Additionally, voltage compensation techniques may be used to maintain higher operating frequencies of processors at lower temperatures. The voltage compensation techniques, however, may also result in higher dynamic power and leakage current, which in turn creates a substantial increase in processor power dissipation. Accordingly, cooling and electrical energy costs may be increased, and processor performance may be reduced. Alternatively, if the junction temperature is too high, the higher leakage current associated with temperature will typically increase the electrical energy costs.

BRIEF DESCRIPTION OF THE DRAWINGS

The various advantages of the embodiments will become apparent to one skilled in the art by reading the following specification and appended claims, and by referencing the following drawings, in which:

FIG. 4 is a flowchart of an example of a method of managing processor power according to an embodiment;

FIG. 5 is a block diagram of an example of a computing system according to an embodiment; and FIG. 6 is an illustration of an example of a semiconductor apparatus according to an embodiment.

DESCRIPTION OF EMBODIMENTS

Figure 1:
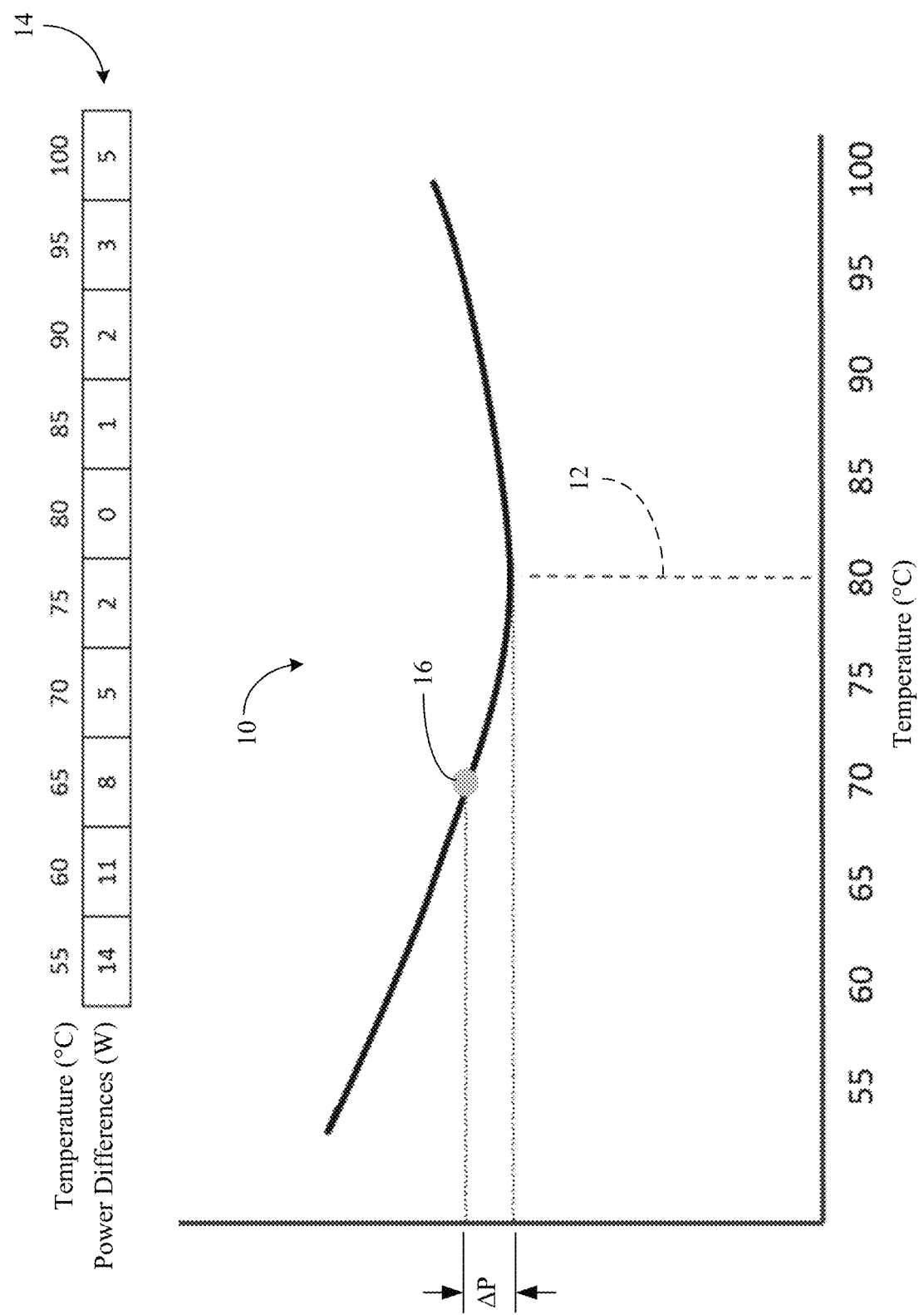
FIG. 1 is an illustration of an example of a register and a plot of a temperature versus power dissipation curve according to an embodiment.

Turning now to FIG. 1, a plot of a curve 10 is shown in which the power dissipation (e.g., wasted power) of a processor is plotted against temperature. The illustrated curve 10 demonstrates an inverse temperature dependency (ITD) relationship. More particularly, the ITD relationship may result from a voltage compensation technique in which the processor voltage is dynamically increased at lower temperatures to maintain higher operating frequencies of the processor. The voltage compensation may also result in higher dynamic power and leakage current, which in turn increases processor power dissipation.

In the illustrated example, a most efficient temperature 12 corresponds to the minimum power dissipation of the processor. As will be discussed in greater detail, a set of power differences (e.g., deltas, savings) between other temperatures and the most efficient temperature 12 is determined and stored to a dynamically updated register 14, which may in turn be used to control a cooling subsystem (e.g., liquid cooling technology) associated with the processor. Thus, if a current temperature 16 (e.g., instantaneous real-time temperature) is at a point (e.g., 70° C.) that is cooler than the most efficient temperature 12, but results in more power dissipation (e.g., ΔP, or 5 W in the illustrated example), the processor may be considered to be in an "overcooled" condition/state. In such a case, the cooling subsystem might be throttled at the current temperature 16 to increase the real-time temperature of the processor towards the most efficient temperature 12. Accordingly, the illustrated solution enables a reduction in the power associated with operating the processor as well as the power associated with operating the cooling system (e.g., cooling overhead). Indeed, a performance benefit may be realized by operating the processor at higher "turbo" frequencies and/or increased residency of the processor at a given turbo frequency.

Figure 2:
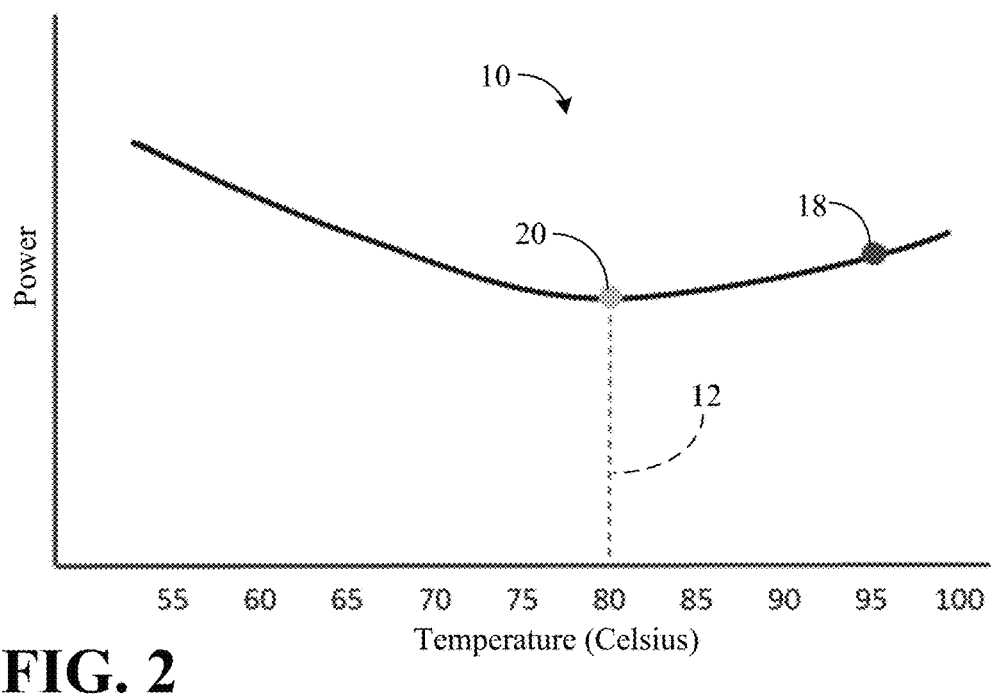
FIG. 2 is a plot of an example of a temperature versus power dissipation curve according to another embodiment.

FIG. 2 shows another example of the curve 10 in which a current temperature 20 is at the most efficient temperature 12. In such a case, the register 14 (FIG. 1) might be used to propose a higher temperature 18 if the associated processor power increase would still be less than the power savings associated with throttling the cooling subsystem. Other cooling controls and/or techniques may also be used to optimize processor power in terms of system cooling overhead.

Figure 3A:
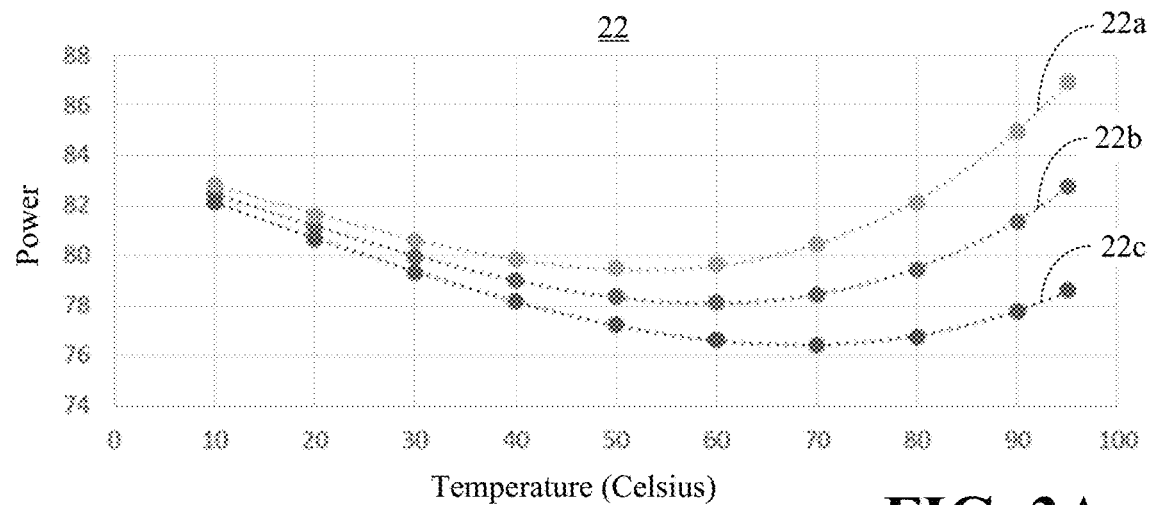
FIGS. 3A and 3B are plots of examples of part-specific parameter curves according to embodiments.
Figure 3B:
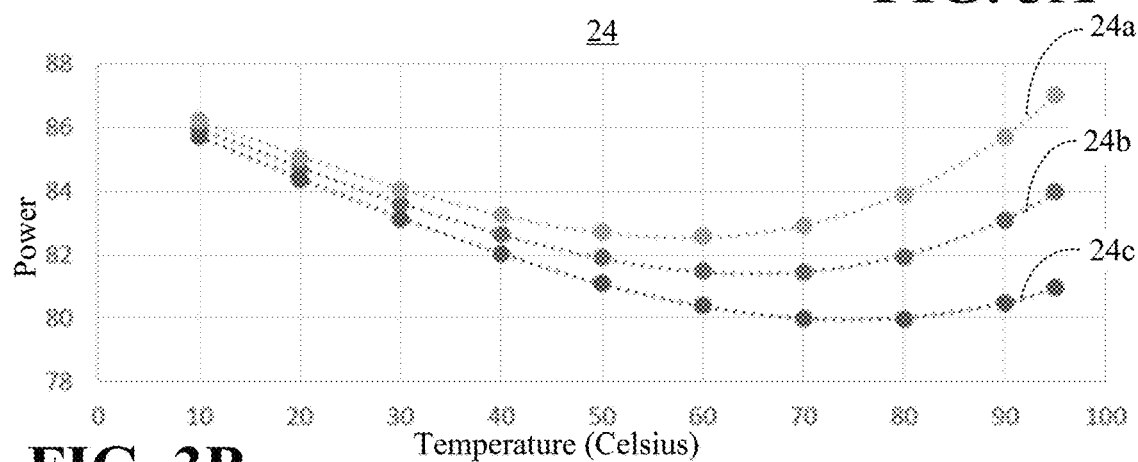

FIGS. 3A and 3B demonstrate that, in addition to real-time data, part-specific parameters such as, for example, inverse temperature dependency (ITD) slope, leakage characteristics, dynamic capacitance, etc., may be used to determine the set of power differences. More particularly, a first set of part-specific parameter curves 22 (22a-22c) is shown for a first processor having, for example, a core voltage of 0.73V, a core frequency of 2.1 GHz, and a core dynamic capacitance of 2.1 nF. In the illustrated example, a typical leakage curve 22b has an efficient temperature of approximately 60°. Thus, below 60°, ITD voltage compensation is applied and the power dissipation increases as the temperature is reduced. At temperatures above 60°, the ITD voltage compensation is no longer applied, but power increases due to increased leakage current. Similarly, a high leakage curve 22a has an efficient temperature of approximately 50° and a low leakage curve 22c has an efficient temperature of approximately 70°. The curves 22 may therefore be used to determine the ITD slope for a given processor and leakage characteristic (e.g., high, typical or low, depending on manufacturing variation).

Additionally, a second set of part-specific parameter curves 24 (24a-24c) is shown for a second processor having, for example, a core voltage of 0.75V, a core frequency of 2.10 GHz, and a core dynamic capacitance of 3.6 nF. In the illustrated example, a high leakage curve 24a has an efficient temperature of approximately 55°, a typical leakage curve 24b has an efficient temperature of approximately 65°, and a low leakage curve 24c has an efficient temperature of approximately 75°. Again, the curves 24 may be used to determine the ITD slope for a given processor and leakage characteristic (e.g., high, typical or low, depending on manufacturing variation). The values used herein are to facilitate discussion only.

In one example, the part-specific parameters are fused into the processor during manufacturing or assembly. The determination of the set of power differences may be made based on real-time data (e.g., temperature data, voltage data, current data, frequency data, etc.) in addition to the part-specific parameters. In this regard, the register may be dynamically updated to facilitate real-time control over the processor and the cooling system.

FIG. 4 shows a method 26 of managing processor power. The method 26 may be implemented in one or more modules as a set of logic instructions stored in a machine- or computer-readable storage medium such as RAM, ROM, programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 26 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, pCode, state-setting data, configuration data for integrated circuitry, state information that personalizes electronic circuitry and/or other structural components that are native to hardware (e.g., host processor, central processing unit/CPU, microcontroller, etc.).

Illustrated processing block 28 provides for determining an efficient temperature of a processor based on real-time data and one or more part-specific parameters associated with a processor. The efficient temperature may be an optimal temperature that corresponds to, for example, the real-time minimum power dissipation of the processor. In one example, the real-time data includes temperature data, voltage data, current data, frequency data, etc., or any combination thereof. Moreover, the part-specific parameter(s) might include an ITD slope, a leakage characteristic, a dynamic capacitance, etc., or any combination thereof. Block 28 may include retrieving the part-specific parameters from one or more fuses.

A set of power differences between other temperatures and the efficient temperature is determined at block 30. Additionally, illustrated block 32 provides for storing the set of power differences to a register (e.g., an internal register of the processor). A cooling subsystem may be controlled at block 34 based on the set of power differences in the register. In one example, block 34 includes controlling (e.g., throttling) the cooling subsystem to increase the real-time temperature of the processor (e.g., to the efficient temperature or above the efficient temperature, depending on the circumstances). In one example, the method 26 is dynamically repeated to maintain the optimal processor power in terms of system cooling overhead.

FIG. 5 shows a computing system 36 that may generally be part of an electronic device/system having computing functionality (e.g., personal digital assistant/PDA, notebook computer, tablet computer, convertible tablet, server), communications functionality (e.g., smart phone), imaging functionality (e.g., camera, camcorder), media playing functionality (e.g., smart television/TV), wearable functionality (e.g., watch, eyewear, headwear, footwear, jewelry), vehicular functionality (e.g., car, truck, motorcycle), robotic functionality (e.g., autonomous robot), etc., or any combination thereof. In the illustrated example, the system 36 includes a graphics processor 38 (e.g., graphics processing unit/GPU) and a host processor 40 (e.g., central processing unit/CPU) having a processor core 42 and a register 44 (e.g., mailbox implementation that does not call for additional transistors). The illustrated host processor 40 also includes an integrated memory controller (IMC) 46 that is coupled to a system memory 48.

Additionally, the illustrated system 36 includes an input output (IO) module 50 implemented together with the host processor 40, and the graphics processor 38 on an SoC 52 (e.g., semiconductor die). In one example, the IO module 50 communicates with a display 54 (e.g., touch screen, liquid crystal display/LCD, light emitting diode/LED display), a network controller 56 (e.g., wired and/or wireless), mass storage 58 (e.g., hard disk drive/HDD, optical disk, solid state drive/SSD, flash memory), and a cooling subsystem 60 (e.g., including liquid cooling technology).

The illustrated IO module 50 includes a power control unit (PCU) 62 having logic 64 (e.g., logic instructions, configurable logic, fixed-functionality hardware logic, etc., or any combination thereof) to perform one or more aspects of the method 26 (FIG. 4), already discussed. Thus, the logic 64 may determine an efficient temperature of the processor core 42 based on real-time data and one or more part-specific parameters associated with the processor core 42, determine a set of power differences between other temperatures and the efficient temperature, and store the set of power differences to the register 44. In one example, the logic 64 retrieves the part-specific parameters from one or more fuses 67 on the host processor 40. The system memory 48 and/or the mass storage 58 may include instructions 65 (e.g., system thermal management software), which when executed by, for example, the host processor 40 and/or the IO module 50, cause the SoC 52 to access the register 44 and control the cooling subsystem 60 based on the set of power differences in the register 44.

Accordingly, if the current temperature is at a point that is cooler than the efficient temperature, but results in more power dissipation, the processor core 42 may be considered to be in an "overcooled" condition/state. In such a case, the cooling subsystem 60 might be throttled at the current temperature to increase the real-time temperature of the processor core 42 towards the more efficient temperature. Accordingly, the illustrated system 36 enables a reduction in the power associated with operating the processor core 42 as well as the power associated with operating the cooling system 60. Indeed, a performance benefit may be realized by operating the processor core 42 at higher "turbo" frequencies and/or increased residency of the processor core 42 at a given turbo frequency.

Moreover, even if the current temperature is at the most efficient temperature, the register 44 may be used to propose and/or establish a higher operating temperature. Such an approach may be beneficial if the associated processor power increase would still be less than the power savings associated with throttling the cooling subsystem 60. Other cooling controls and/or techniques may also be used to optimize processor power in terms of system cooling overhead. Although the logic 64 is shown as residing in the PCU 62, the logic 64 may also be located elsewhere in the SoC 52. Moreover, the illustrated solution may be applied to multi-core and/or multi-processor architectures, wherein the cores/processors have disparate ITD profiles and number in the hundreds or thousands. In this regard, each core/processor may be assigned a register to track the power deltas in real-time and on an individual basis. Alternatively, the register may be shared by multiple processors/cores.

FIG. 6 shows a semiconductor apparatus 66. The apparatus 66 may be readily substituted for the SoC 52 (FIG. 5), already discussed. The illustrated apparatus 66 includes one or more substrates 68 (e.g., silicon, sapphire, gallium arsenide) and logic 70 (e.g., transistor array and other integrated circuit/IC components) coupled to the substrate(s) 68. The logic 70 may be implemented at least partly in configurable logic or fixed-functionality hardware logic. In one example, the logic 70 generally implements one or more aspects of the method 26 (FIG. 4), already discussed. Accordingly, the logic 70 may determine an efficient temperature of a processor based on real-time data and one or more part-specific parameters associated with the processor, determine a set of power differences between other temperatures and the efficient temperature, and store the set of power differences to a register.

Additionally, the logic 70 may control a cooling subsystem based on the set of power differences in the register. In one example, the logic 70 includes transistor channel regions that are positioned (e.g., embedded) within the substrate(s) 68. Thus, the interface between the logic 70 and the substrate(s) 68 may not be an abrupt junction. The logic 70 may also be considered to include an epitaxial layer that is grown on an initial wafer of the substrate(s) 68.

ADDITIONAL NOTES AND EXAMPLES

Example 1 may include a performance-enhanced computing system comprising a cooling subsystem, a processor, a register, a power control unit to determine an efficient temperature of the processor based on real-time data and one or more part-specific parameters associated with the processor, determine a set of power differences between other temperatures and the efficient temperature, and store the set of power differences to the register, and a memory including a set of instructions, which when executed by the processor, cause the computing system to control the cooling subsystem based on the set of power differences in the register.

Example 2 may include the computing system of Example 1, wherein the efficient temperature corresponds to a real-time minimum power dissipation of the processor.

Example 3 may include the computing system of Example 1, wherein the real-time data includes one or more of temperature data, voltage data, current data or frequency data.

Example 4 may include the computing system of Example 1, wherein the one or more part-specific parameters include one or more of an inverse temperature dependency slope, a leakage characteristic or a dynamic capacitance.

Example 5 may include the computing system of Example 1, further including one or more fuses, wherein the one or more fuses include the one or more part-specific parameters and the power control unit is to retrieve the one or more part-specific parameters from the one or more fuses.

Example 6 may include the computing system of Example 1, wherein the register is an internal register of the processor.

Example 7 may include the computing system of Example 1, wherein the cooling subsystem is controlled to increase a real-time temperature of the processor.

Example 8 may include a semiconductor apparatus comprising one or more substrates, and logic coupled to the one or more substrates, wherein the logic is implemented at least partly in one or more of configurable logic or fixed-functionality hardware logic, the logic coupled to the one or more substrates to determine an efficient temperature of a processor based on real-time data and one or more part-specific parameters associated with the processor, determine a set of power differences between other temperatures and the efficient temperature, and store the set of power differences to a register.

Example 9 may include the semiconductor apparatus of Example 8, wherein the efficient temperature corresponds to a real-time minimum power dissipation of the processor.

Example 10 may include the semiconductor apparatus of Example 8, wherein the real-time data includes one or more of temperature data, voltage data, current data or frequency data.

Example 11 may include the semiconductor apparatus of Example 8, wherein the one or more part-specific parameters include one or more of an inverse temperature dependency slope, a leakage characteristic or a dynamic capacitance.

Example 12 may include the semiconductor apparatus of Example 8, wherein the logic coupled to the one or more substrates is to retrieve the one or more part-specific parameters from one or more fuses.

Example 13 may include the semiconductor apparatus of Example 8, wherein the set of power differences is stored to an internal register of the processor.

Example 14 may include at least one computer readable storage medium comprising a set of instructions, which when executed by a computing system, cause the computing system to determine an efficient temperature of a processor based on real-time data and one or more part-specific parameters associated with the processor, determine a set of power differences between other temperatures and the efficient temperature, and store the set of power differences to a register.

Example 15 may include the at least one computer readable storage medium of Example 14, wherein the efficient temperature corresponds to a real-time minimum power dissipation of the processor.

Example 16 may include the at least one computer readable storage medium of Example 14, wherein the real-time data includes one or more of temperature data, voltage data, current data or frequency data.

Example 17 may include the at least one computer readable storage medium of Example 14, wherein the one or more part-specific parameters include one or more of an inverse temperature dependency slope, a leakage characteristic or a dynamic capacitance.

Example 18 may include the at least one computer readable storage medium of Example 14, wherein the instructions, when executed, cause the computing system to retrieve the one or more part-specific parameters from one or more fuses.

Example 19 may include the at least one computer readable storage medium of Example 14, wherein the set of power differences is stored to an internal register of the processor.

Example 20 may include a method comprising determining an efficient temperature of a processor based on real-time data and one or more part-specific parameters associated with the processor, determining a set of power differences between other temperatures and the efficient temperature, and storing the set of power differences to a register.

Example 21 may include the method of Example 20, the method of Example 20, wherein the efficient temperature corresponds to a real-time minimum power dissipation of the processor.

Example 22 may include the method of Example 20, wherein the real-time data includes one or more of temperature data, voltage data, current data or frequency data.

Example 23 may include the method of Example 20, wherein the one or more part-specific parameters include one or more of an inverse temperature dependency slope, a leakage characteristic or a dynamic capacitance.

Example 24 may include the method of Example 20, further including retrieving the one or more part-specific parameters from one or more fuses.

Example 25 may include the method of Example 20, wherein the set of power differences is stored to an internal register of the processor.

Thus, technology described herein may enable system management components to make real-time decisions between processor cooling costs and processor power dissipation. Such an approach enables over cooling to be avoided while optimizing processor power in terms of system cooling overhead. Indeed, the technology described herein simultaneously provides lower power dissipation, lower cooling costs and higher performance. For example, end users may be able to run data centers at the minimum overall power dissipation level. Consequently, power delivery and cooling costs may be reduced and the maximum power headroom is made available for performance increases (e.g., via turbo operation).

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A computing system comprising:
a cooling subsystem;
a processor;
a register;
a power control unit to
determine an efficient temperature of the processor based on real-time data and one or more part-specific parameters associated with the processor, wherein the efficient temperature corresponds to a real-time minimum power dissipation of the processor,
determine a set of power differences between other temperatures and the efficient temperature, wherein the set of power differences is to correspond to power savings between the efficient temperature and the other temperatures,
store the set of power differences to the register, and
dynamically update the set of power differences stored in the register; and
a memory including a set of instructions, which when executed by the processor, cause the computing system to:
identify a first power difference from the set of power differences based on a real-time temperature of the processor, wherein the real-time temperature is to be below the efficient temperature,
determine, based on the first power difference, that the real-time temperature of the processor is to be raised to the efficient temperature, and
control the cooling subsystem based on the first power difference to cause the cooling subsystem to increase the real-time temperature of the processor to the efficient temperature.

2. The computing system of claim 1, wherein the real-time data includes one or more of temperature data, voltage data, current data or frequency data.

3. The computing system of claim 1, wherein the one or more part-specific parameters include one or more of an inverse temperature dependency slope, a leakage characteristic or a dynamic capacitance.

4. The computing system of claim 1, further including one or more fuses, wherein the one or more fuses include the one or more part-specific parameters and the power control unit is to retrieve the one or more part-specific parameters from the one or more fuses.

5. The computing system of claim 1, wherein the register is an internal register of the processor.

6. At least one non-transitory computer readable storage medium comprising a set of instructions, which when executed by a computing system, cause the computing system to:

determine an efficient temperature of a processor based on real-time data and one or more part-specific parameters associated with the processor, wherein the efficient temperature corresponds to a real-time minimum power dissipation of the processor;

determine a set of power differences between other temperatures and the efficient temperature, wherein the set of power differences is to correspond to power savings between the efficient temperature and the other temperatures;

store the set of power differences to a register;

dynamically update the set of power differences stored in the register;

identify a first power difference from the set of power differences based on a real-time temperature of the processor, wherein the real-time temperature is to be below the efficient temperature; and determine, based on the first power difference, that the real-time temperature of the processor is to be raised to the efficient temperature.

7. The at least one non-transitory computer readable storage medium of claim 6, wherein the real-time data includes one or more of temperature data, voltage data, current data or frequency data.

8. The at least one non-transitory computer readable storage medium of claim 6, wherein the one or more part-specific parameters include one or more of an inverse temperature dependency slope, a leakage characteristic or a dynamic capacitance.

9. The at least one non-transitory computer readable storage medium of claim 6, wherein the instructions, when executed, cause the computing system to retrieve the one or more part-specific parameters from one or more fuses.

10. The at least one non-transitory computer readable storage medium of claim 6, wherein the set of power differences is stored to an internal register of the processor.

11. The at least one non-transitory computer readable storage medium of claim 6, wherein the instructions, when executed, cause the computing system to control a cooling subsystem based on the first power difference to cause the cooling subsystem to increase the real-time temperature of the processor to the efficient temperature.

12. A method implemented with a computing system, comprising:

determining an efficient temperature of a processor based on real-time data and one or more part-specific parameters associated with the processor, wherein the efficient temperature corresponds to a real-time minimum power dissipation of the processor;

determining a set of power differences between other temperatures and the efficient temperature, wherein the set of power differences is to correspond to power savings between the efficient temperature and the other temperatures;

storing the set of power differences to a register;

dynamically updating the set of power differences stored in the register;

identifying a first power difference from the set of power differences based on a real-time temperature of the processor, wherein the real-time temperature is to be below the efficient temperature; and determining, based on the first power difference, that the real-time temperature of the processor is to be raised to the efficient temperature.

13. The method of claim 12, wherein the real-time data includes one or more of temperature data, voltage data, current data or frequency data.

14. The method of claim 12, wherein the one or more part-specific parameters include one or more of an inverse temperature dependency slope, a leakage characteristic or a dynamic capacitance.

15. The method of claim 12, further including retrieving the one or more part-specific parameters from one or more fuses.

16. The method of claim 12, wherein the set of power differences is stored to an internal register of the processor.

17. The method of claim 12, further comprising controlling a cooling subsystem based on the first power difference to cause the cooling subsystem to increase the real-time temperature of the processor to the efficient temperature.

\* \* \* \* \*